US006618653B2

United States Patent
Uehara (10) Patent No.: US 6,618,653 B2
(45) Date of Patent: Sep. 9, 2003

(54) MOTOR VEHICLE POSITION RECOGNIZING SYSTEM

(75) Inventor: Naohisa Uehara, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/963,518

(22) Filed: Sep. 27, 2001

(65) Prior Publication Data

US 2002/0143442 A1 Oct. 3, 2002

(30) Foreign Application Priority Data

Mar. 27, 2001 (JP) ........................................ 2001-090114

(51) Int. Cl.$^7$ ........................... G01C 21/00; G06F 17/00
(52) U.S. Cl. ........................... 701/23; 701/26; 180/167; 342/70
(58) Field of Search ............................... 701/23, 26, 41, 701/300, 301; 180/167; 342/70, 71, 66; 318/587; 356/5.01, 28

(56) References Cited

U.S. PATENT DOCUMENTS 5,369,591 A * 11/1994 Broxmeyer ................. 701/301
5,680,122 A * 10/1997 Mio ........................... 340/932
5,815,825 A *  9/1998 Tachibana et al. .......... 701/23
5,957,983 A *  9/1999 Tominaga .................... 701/23
6,301,530 B1 * 10/2001 Tamura ....................... 701/23

FOREIGN PATENT DOCUMENTS

JP          9-292236        11/1997
JP         10-206173         8/1998

* cited by examiner

Primary Examiner—Tan Q. Nguyen
(74) Attorney, Agent, or Firm—Sughrue Mion, PLLC

(57) ABSTRACT

A motor vehicle position recognizing system which can ensure high accuracy for an arithmetic processing for determining a vehicle position in a transverse direction of a road by minimizing error involved in the arithmetic processing by suppressing occurrence of discontinuity even when a magnetic sensor whose output is destined for the arithmetic processing is changed over to another one. The system includes magnetic markers (1) laid on a road surface at predetermined locations for forming a magnetic field zone, a plurality of vehicle-onboard magnetic sensors (2) for detecting the intensity of the magnetic field zone formed by the magnetic markers (1), a vehicle position arithmetic means (3A) for arithmetically determining a position (Phr) of the motor vehicle in the transverse direction as a vehicle position on the basis of the field intensities detected by the magnetic sensors (2), and a vehicle position correcting means (6) for correcting an arithmetically determined value of the position of the motor vehicle as determined by the vehicle position arithmetic means (3A).

19 Claims, 8 Drawing Sheets

MOTOR VEHICLE POSITION RECOGNIZING SYSTEM

BACKGROUND OF THE INVENTION

1. Field of the Invention

The present invention relates to a motor vehicle position recognizing system for recognizing or detecting with high accuracy a position of a motor vehicle such as automobile, car, track or the like objects moving or traveling on a road on the basis of magnetic field intensities generated at predetermined positions on a road surface and detected by a magnetic field intensity detecting means mounted on the vehicle.

2. Description of Related Art

In recent years, there have been proposed and developed for practical applications a variety of motor vehicle position recognizing systems in which magnetic field generating means are laid on a road for generating or forming predetermined magnetic fields at predetermined positions on the road surface for thereby detecting with high accuracy the vehicle position on the basis of the magnetic field intensity detected by the magnetic field intensity detecting means mounted on the motor vehicle traveling on the road surface with a view to making it possible to realize an automatic steering control of the motor vehicle and a lane departure alarming function.

By way of example, the hitherto known or conventional motor vehicle position recognizing system disclosed in Japanese Patent Application Laid-Open Publication No. 206173/1998 (JP-A-10-206173) is comprised of magnetic field generating means or magnetic markers laid on the road surface at predetermined positions for generating or forming predetermined magnetic fields and a magnetic field intensity detecting means (magnetic sensor) mounted on a motor vehicle for detecting the magnetic field emanated from the magnetic markers, for thereby arithmetically determining the vehicle position on the basis of the magnetic field intensity detected by the magnetic sensor.

Further, the conventional motor vehicle position recognizing system mentioned above includes a vehicle position arithmetic means which incorporates therein a vehicle position arithmetic operation propriety decision means for making decision as to propriety of the arithmetic determination concerning the position of the motor vehicle so that the arithmetic operation for determining the motor vehicle position on the basis of the field intensity detected by the magnetic sensor is performed in dependence on the result of the decision made by the vehicle position arithmetic operation propriety decision means.

In addition, the conventional motor vehicle position recognizing system mentioned above includes a nonmagnetic field position determining means for determining nonmagnetic field position which is insusceptible to the influence of the magnetic sensor (e.g. mid or intermediate position between the magnetic markers) so that the magnetic field intensity detected by the magnetic sensor can be corrected by referencing the magnetic field intensities at the nonmagnetic field positions recorded in advance.

With the conventional motor vehicle position recognizing system described above, the magnetic field intensity can be determined without suffering the influence of the terrestrial magnetism and the magnetic field(s) emanated from the motor vehicle itself. Thus, the vehicle position can be detected or recognized with reasonable accuracy.

In this conjunction, it is however noted that the characteristics and the types of the magnetic markers may differ from one another. Besides, the height of the magnetic sensor mounted on the motor vehicle relative to the magnetic marker may undesirably change in dependence on the conditions of the road surface (e.g. roughness, unevenness, snowfall, etc.).

Figure 7:
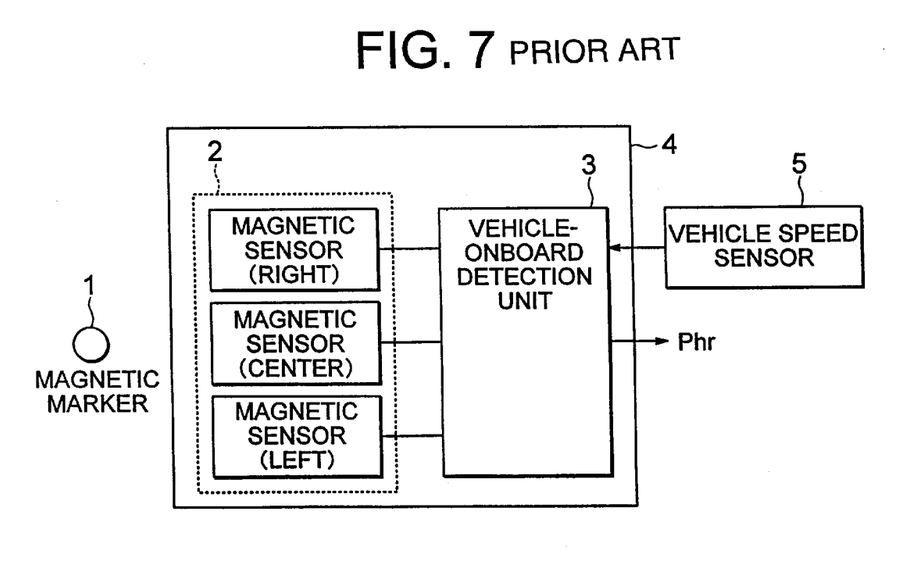
FIG. 7 is a block diagram showing generally and schematically an arrangement of a conventional motor vehicle position recognizing system.

FIG. 7 is a block diagram showing generally and schematically a conventional motor vehicle position recognizing system such as disclosed, for example, in Japanese Patent Application Laid-Open Publication mentioned above.

Referring to FIG. 7, a magnetic field generating means implemented as a magnetic marker or markers 1 are laid on a road for the motor vehicles.

Parenthetically, only one magnetic marker 1 is representatively shown in the figure. It should however be appreciated that a plurality of the magnetic markers 1 may of course be laid on the road, for example, in the form of a marker row or rows.

In this conjunction, the magnetic markers 1 of a marker row laid at a center position on a lane may be arrayed such that the magnetic polarities of the magnetic markers change alternatively, e.g. in the order of N, S, N, S, . . . . On the other hand, in the marker row laid on the lane, being offset to the right from the center marker row by e.g. 1 m, the magnetic markers may be arrayed with a uniform polarity, e.g. in the sequence of N, N, N, N, . . . . Similarly, in the marker row laid with the offset to the left from the center marker row by e.g. 1 m, the magnetic markers may be arrayed with the opposite polarity, e.g. in the sequence of S, S, S, S . . . .

Installed on the motor vehicle running on the road surface on which the magnetic markers 1 are laid is a motor vehicle position recognizing apparatus 4 which is composed of magnetic sensors 2 and a vehicle-onboard detection unit 3. The magnetic sensors 2 are disposed at positions opposite to the magnetic marker rows, respectively. The output signals of the magnetic sensors 2 are supplied to the vehicle-onboard detection unit 3.

More specifically, a plurality of the vehicle-onboard magnetic sensors 2 are disposed in the transverse direction of the motor vehicle (i.e., in the direction orthogonal to the running or traveling direction), e.g. at right, center and left positions, respectively, as is illustrated in FIG. 7.

Further, the motor vehicle is equipped with various types of sensors inclusive of a vehicle speed sensor 5 and others, wherein detection signals outputted from these sensors are inputted to the vehicle-onboard detection unit 3 as well.

The vehicle-onboard detection unit 3 is designed to determine arithmetically a transverse position Phr of the relevant motor vehicle on the basis of the output signals of the magnetic sensors 2, the vehicle speed sensor 5 and others.

Figure 8A:
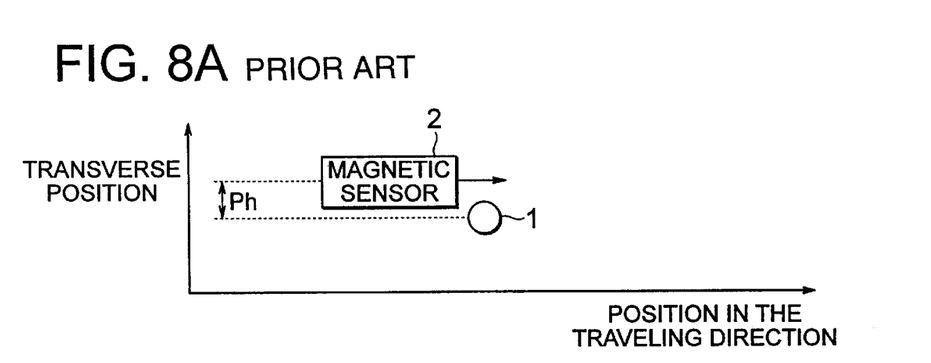
FIG. 8A is a view for graphically illustrating a positional relation between a magnetic sensor and a magnetic marker.
Figure 8B:
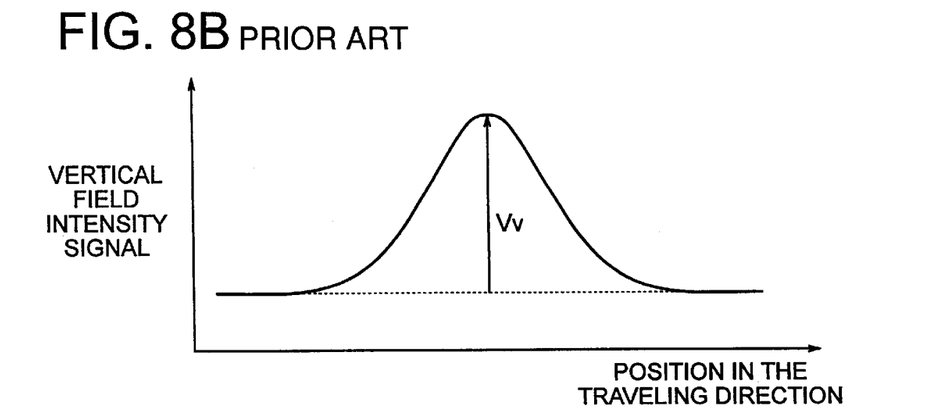
FIG. 8B is a view for graphically illustrating a distribution profile of magnetic field intensity generated by the magnetic marker in a vertical direction.
Figure 8C:
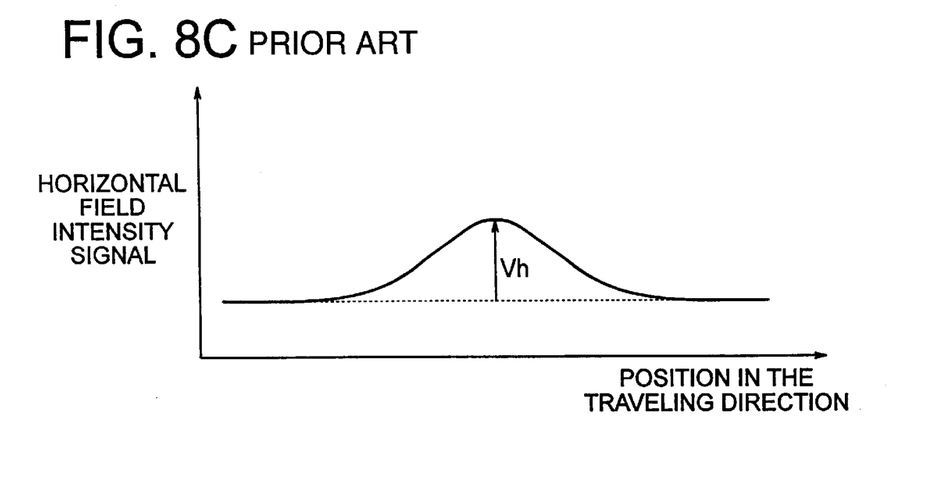
FIG. 8C is a view for graphically illustrating a distribution profile of magnetic field intensity generated by the magnetic marker in a horizontal direction.

Next, by referring to FIGS. 8A, 8B and 8C, description will briefly be made of the operation of the conventional motor vehicle position recognizing system shown in FIG. 7.

FIGS. 8A, 8B and 8C are views for illustrating, respectively, the strength distribution of the output signal of the magnetic sensor 2 and intensities of a vertical magnetic field intensity signal (hereinafter also referred to as the vertical field intensity signal) and a horizontal magnetic field intensity signal (hereinafter also referred to as the horizontal field intensity signal) detected in correspondence to the position of the motor vehicle in the running or traveling direction in dependence on the positional relations between the magnetic sensors 2 and the magnetic markers 1 (i.e., positional deviation Ph of the motor vehicle in the transverse direction).

Each of the magnetic markers 1 laid on the road at predetermined positions generates or forms a magnetic field of a predetermined intensity on or above the road surface. Thus, the motor vehicle equipped with the motor vehicle position recognizing apparatus 4 moves through the magnetic fields mentioned above.

At that time, the plural onboard magnetic sensors 2 output the magnetic field intensity signals in response to the intensities of the magnetic fields generated by the magnetic markers 1, respectively.

The vehicle-onboard detection unit 3 fetches the magnetic field intensity signals from the outputs of the magnetic sensors 2 while sampling the magnetic field intensity signals in dependence on the engine operation state detection signals derived from the outputs of the vehicle speed sensor 5 and others.

The vehicle-onboard detection unit 3 is so designed as to detect the magnetic field intensity distribution in the magnetic field space to thereby determine arithmetically the position Phr of the motor vehicle in the transverse direction on the basis of the spatial field intensity distribution.

The signal outputted from the vehicle-onboard detection unit 3 and indicating the lateral or transverse position Phr of the motor vehicle determined arithmetically as mentioned above is then inputted to an electronic control unit (ECU) (not shown) incorporated in a motor vehicle control apparatus (not shown either) which is so designed as to issue an alarm message or perform a vehicle steering control in response to the input signal indicating the lateral or transverse position Phr of the motor vehicle.

By way of example, let's assume that one of the magnetic sensors 2 installed on the motor vehicle spatially displaces from the left side to the right side as viewed in FIG. 8A with a positional deviation Ph (refer to double-arrows) in the lateral or transverse direction relative to the magnetic marker 1, as illustrated in FIG. 8A.

In that case, the magnetic sensor 2 outputs a vertical field intensity signal and a horizontal field intensity signal in response to the vertical field intensity and the horizontal field intensity, respectively, of the magnetic field generated by the magnetic marker 1, as can be seen in FIGS. 8B and 8C. These magnetic field intensity signals assume maximum or peak values Vv and Vh, respectively, at the position where the magnetic sensor 2 approaches most closely to the magnetic marker 1.

The vehicle-onboard detection unit 3 arithmetically determines the positional deviation Ph of the magnetic sensor 2 in the lateral or transverse direction relative to the magnetic marker 1 on the basis of the maximum or peak value Vv of the vertical field intensity signal and the maximum or peak value Vh of the horizontal field intensity signal as determined.

At this juncture, it is to be mentioned that the positive/negative polarity (i.e., plus/minus sign) of the individual magnetic field intensity signals and the peak values Vv and Vh are determined in dependence on the polarity of the magnetic marker 1.

Next, by reference to a flow chart shown in FIG. 9 together with FIG. 10, description will be made in the concrete of operation of the vehicle-onboard detection unit 3 of the conventional motor vehicle position recognizing system.

Figure 10:
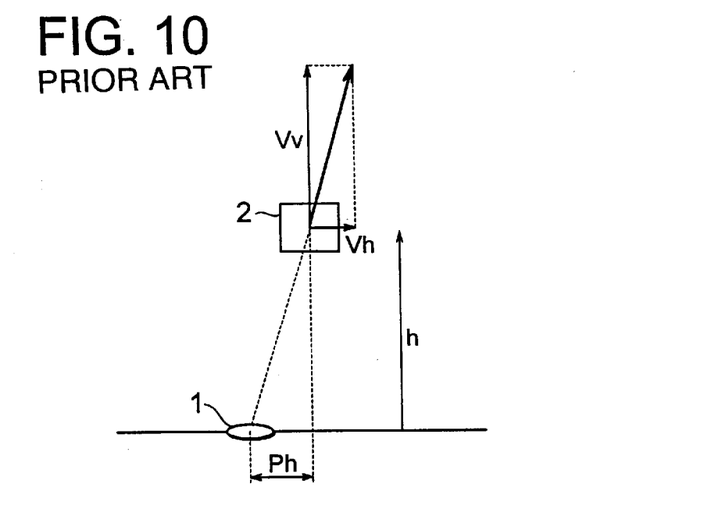
FIG. 10 is a view for graphically illustrating an arithmetic processing for determining a positional deviation of a motor vehicle in the transverse direction as executed by the conventional motor vehicle position recognizing system.

FIG. 10 is a view for graphically illustrating the peak values Vv and Vh of the magnetic field intensity of the magnetic sensor 2 of concern, installation height h at which the magnetic sensor 2 is mounted and the transverse positional deviation Ph of the magnetic sensor 2 relative to the magnetic marker 1 (i.e., positional deviation of the magnetic sensor in the transverse direction relative to the magnetic marker).

Figure 9:
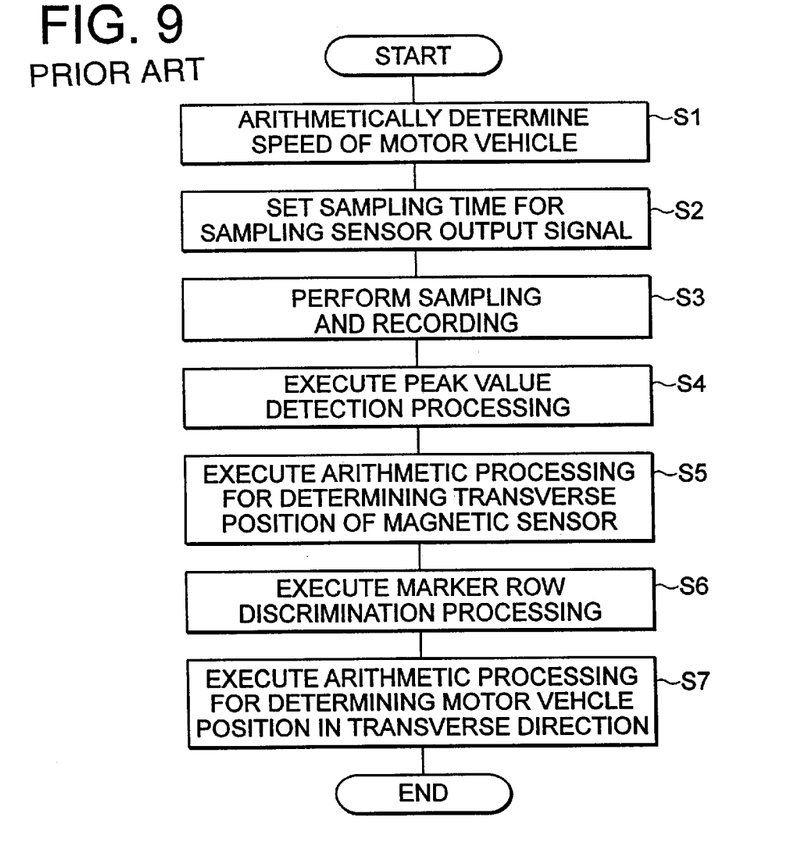
FIG. 9 is a flow chart for illustrating a processing procedure for arithmetically determining a motor vehicle position in a transverse direction as executed in the conventional motor vehicle position recognizing system.

Referring to FIG. 9, the vehicle-onboard detection unit 3 arithmetically determines at first a vehicle speed (i.e., speed of the motor vehicle) on the basis of the output signal of the vehicle speed sensor 5 (step S1).

Subsequently, sampling time for sampling the output signal of the magnetic sensor 2 at a predetermined distance interval (e.g. per 5 cm) is set on the basis of the vehicle speed determined arithmetically in the step S1 (step S2).

In succession, the output signal of the magnetic sensor 2 is sampled at the sampling time interval set in the step S2 to be subsequently stored (step S3). In this manner, the magnetic field intensity signal derived from the output of the magnetic sensor 2 is stored in a storage unit (not shown) which is in corporated in the vehicle-onboard detection unit 3 to be used as the data concerning the spatial field intensity distributions.

Parenthetically, although it has been described above that the sampling time is so set in succession to the arithmetic determination of the vehicle speed that the sampling interval corresponds to the predetermined distance interval (steps S1 to S3). It should, however, be understood that the covered distance may directly be determined arithmetically on the basis of output pulses contained in the output signal of the vehicle speed sensor 5 to thereby effect the sampling of the magnetic field intensity signal every time when the covered distance reaches predetermined values, respectively.

Next, the maximum point, i.e., the peak value, is determined on the basis of the spatial field intensity distribution data acquired from the output of the magnetic sensor 2 in the step S3 to thereby determine arithmetically the peak value Vv of the vertical field intensity as well as the peak value Vh of the horizontal field intensity (step S4).

In succession, the magnetic sensor 2 which exhibits the greatest absolute value of the maximum vertical field intensity among the magnetic field intensity signals derived from the plural magnetic sensors 2 is selected to be subjected to the arithmetic processing, whereon the peak vertical field intensity value Vv and the peak horizontal field intensity value Vh derived from the output of the magnetic sensor 2 selected as the object for arithmetic processing are set as the ultimate peak values, respectively.

Subsequently, the positional deviation Ph of the magnetic sensor 2 in the transverse direction relative to the magnetic marker 1 is arithmetically determined in accordance with the undermentioned expression (1) on the basis of the ultimate peak values Vv and Vh as determined and the installation height h (refer to FIG. 10) of the magnetic sensor 2 selected as the object for the arithmetic processing (step S5):

$$Ph = k \times h \times Vh / Vv \qquad (1)$$

where k represents a predetermined coefficient.

In this conjunction, it is to be mentioned that although it has been described that the positional deviation Ph of the magnetic sensor 2 in the transverse direction relative to the magnetic marker 1 is arithmetically determined in accordance with the expression (1) mentioned above, it should, however, be understood that such positional deviation Ph of the magnetic sensor can equally be determined on the basis of map data determined empirically through experiments and stored in advance.

Subsequently, the vehicle-onboard detection unit 3 adds an offset quantity Os of the magnetic sensor 2 subjected to the arithmetic processing from the center position of the motor vehicle to the positional deviation Ph of the magnetic sensor 2 in the transverse direction to thereby determine arithmetically a positional deviation Phc of the center position of the motor vehicle in the transverse direction relative to the magnetic marker 1 in accordance with the following expression (2):

$$Phc = Ph + Os \quad (2)$$

At this juncture, it should be recalled that the magnetic markers 1 laid on the road surface are implemented in the form of the marker row laid at the center of the lane and the marker rows which are offset to the right and the left, respectively, from the center of the lane and whose polarity arrays differ from each other and from that of the center marker row, as described previously.

Thus, the vehicle-onboard detection unit 3 can determine which of the marker rows the vehicle is currently traveling along on the basis of the polarities of the magnetic markers 1 detected in the past (step S6).

Finally, an offset quantity Or of the marker row from the center of the lane is added to the positional deviation Phc of the center position of the motor vehicle in the transverse direction relative to the magnetic marker 1 to thereby determine arithmetically a positional deviation Phr of the center position of the motor vehicle from the center of the lane in accordance with the undermentioned expression (3) (step S7):

$$Phr = Phc + Or \quad (3)$$

In this manner, the final position of the motor vehicle in the transverse direction relative to the center of the lane (i.e., the deviation Phr) is arithmetically determined, whereon the processing routine shown in FIG. 9 comes to an end.

In the motor vehicle position recognizing system described above, it is noted that not only the characteristics of the magnetic markers 1 may change but also the types thereof may differ from one another. Besides, the heights of the magnetic sensors 2 mounted on the motor vehicle relative to the magnetic markers 1 may change in dependence on the conditions of the road surface (e.g. roughness, unevenness, snowfall, etc.). In that cases, a significant error may be brought about in the vehicle position determined arithmetically in particular when the magnetic sensor 2 whose output is destined for the arithmetic processing is changed over to another one.

In the following, by reference to FIGS. 11 to 13, description will be made in detail of the situation where error makes appearance the arithmetic determination of the vehicle position.

Figure 11:
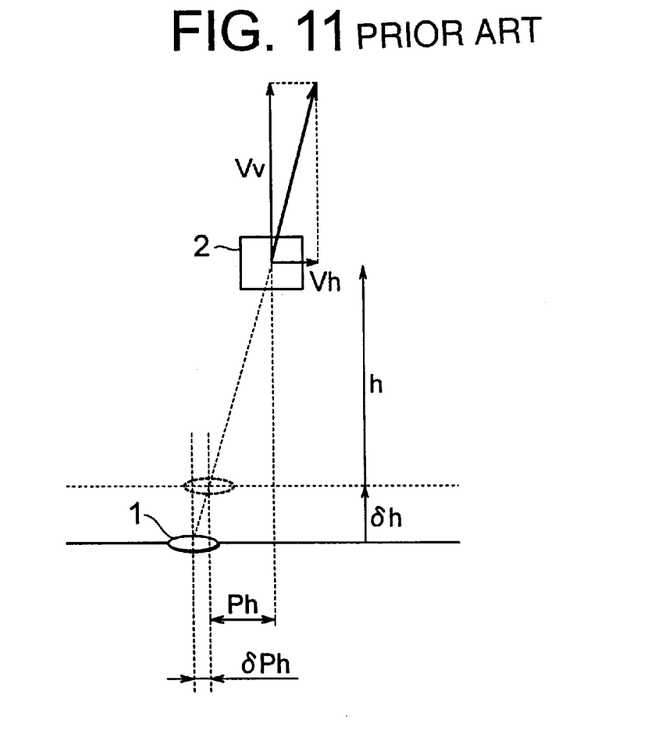
FIG. 11 is a view for graphically illustrating occurrence of error in an arithmetically determined value of the vehicle position in the transverse direction in the conventional motor vehicle position recognizing system.

FIG. 11 is a view for illustrating an error δPh of the arithmetically determined value in the case where the height h of the magnetic sensor 2 relative to the road surface changes or increases by an amount δh (hereinafter also referred to as the height change).

Figure 12:
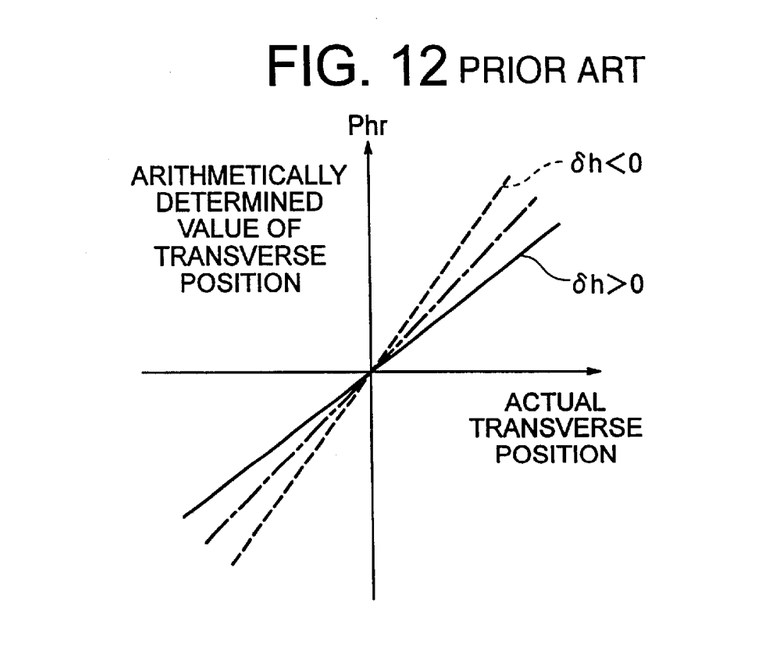
FIG. 12 is a view for graphically illustrating a relation between an actual position of the motor vehicle and an arithmetically determined position thereof in the transverse direction in the states where error makes appearance in the conventional motor vehicle position recognizing system.

Further, FIG. 12 is a view for illustrating a relation between an actual position of the motor vehicle in the transverse direction (taken along the abscissa) and the arithmetically determined value Phr of the position of the motor vehicle in the transverse direction (taken along the ordinate) with the polarity of the height change δh being changed to be positive and negative, respectively.

Figure 13:
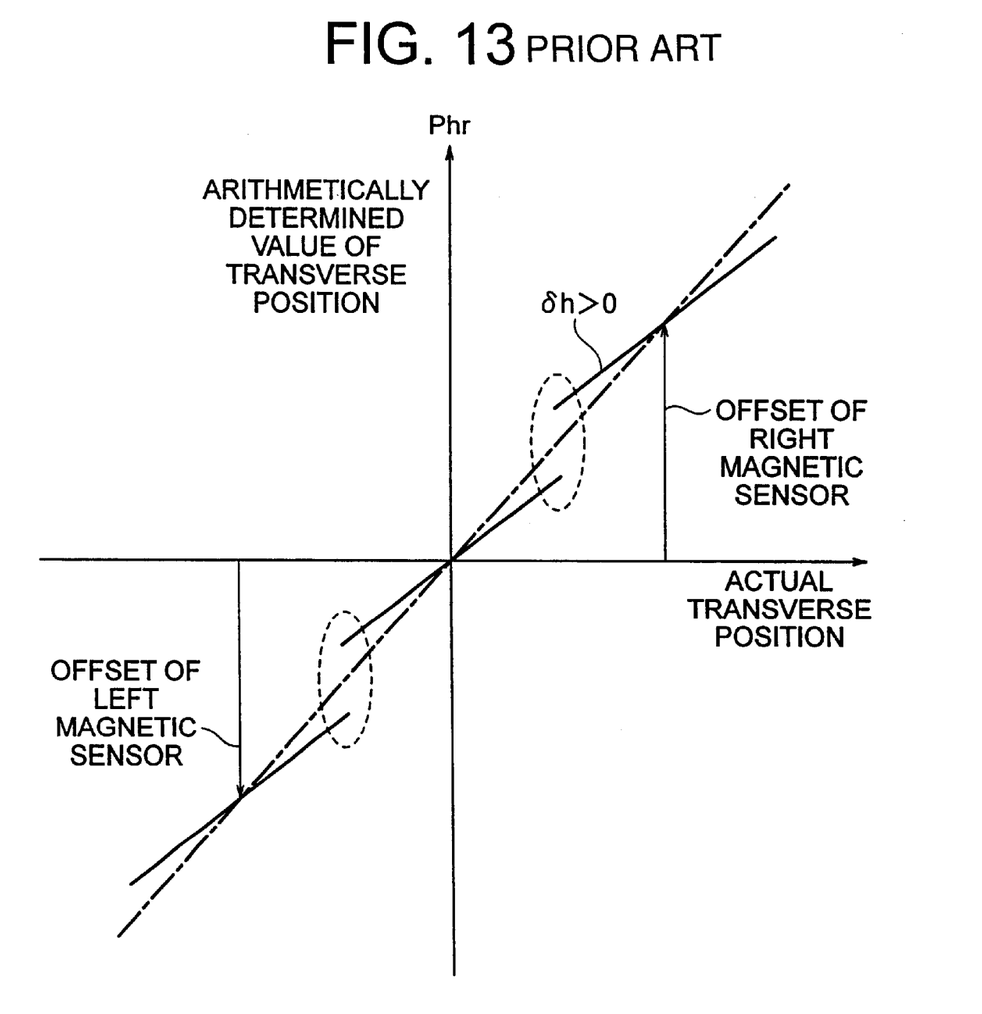
FIG. 13 is a view for graphically illustrating a relation between an actual position of the motor vehicle and an arithmetically determined position thereof in the transverse direction when error makes appearance upon changeover of a processing-subjected magnetic sensor to another one in the conventional motor vehicle position recognizing system.

Furthermore, FIG. 13 is a view for illustrating a relation between an actual position of the motor vehicle in the transverse direction (taken along the abscissa) and the arithmetically determined value Phr of the position of the motor vehicle in the transverse direction (taken along the ordinate) when the magnetic sensor 2 whose output is destined for the arithmetic processing is changed over to another one. In the figure, characteristic of the arithmetically determined value of the vehicle position in the transverse direction is illustrated on the assumption that the polarity of the height change δh is positive.

Referring to FIG. 11 and assuming, by way of example, that the height h of the magnetic sensor 2 relative to the magnetic marker 1 (i.e., relative to the road surface) becomes higher by a height change or increment δh, the vehicle-onboard detection unit 3 will arithmetically determine the positional deviation Ph in the transverse direction on the presumption that the magnetic marker 1 exists at a position (indicated by a phantom line) higher than the actual position of the magnetic marker 1 (indicated by a solid line) by the height increment δh.

Accordingly, the positional deviation Ph in the transverse direction determined arithmetically by the vehicle-onboard detection unit 3 assumes a value which is smaller than the actual positional deviation (=Ph+δPh) in the transverse direction by the error δPh.

More specifically, referring to FIG. 12, the slope of the characteristic straight line of the arithmetically determined value Phr of the vehicle position in the transverse direction relative to the vehicle position in the transverse direction (taken along the ordinate) becomes gentle when the height change δh is of positive polarity (i.e., when δh>0) while it becomes steep when the height change δh is of negative polarity (i.e., when δh<0).

Consequently, when the position Phr of the motor vehicle in the transverse direction is arithmetically determined by processing the output of the magnetic sensor 2 which indicates the greatest absolute value among the peak vertical field intensity values Vv detected by a plurality of magnetic sensors 2, the arithmetic error becomes greatest when the above-mentioned magnetic sensor 2 is changed over to another one. As a result of this, jump or discontinuity makes appearance in the arithmetically determined value Phr of the vehicle position in the transverse direction, as illustrated at portions indicated as enclosed by broken line ellipses, respectively, in FIG. 13.

Parenthetically, although the above description has been made by reference to FIG. 13 on the assumption that the height change δh is of positive polarity, it goes without saying that such discontinuity takes place similarly in the case where the height change δh is of negative polarity.

As is apparent from the above description, when the magnetic sensor 2 whose output is destined to be processed for detecting the magnetic field intensity (the vehicle position in the running direction) is changed over from one to another in the course of traveling of the motor vehicle, discontinuity takes place in the arithmetically determined value Phr of the transverse vehicle position, bringing about remarkable error in the arithmetically determined value Phr of the transverse vehicle position, as a result of which the reliability of the automatic steering control and the lane departure alarming function is degraded or impaired, to a great disadvantage.

It will now be understood that the conventional motor vehicle position recognizing system suffers a problem that when the characteristic of the magnetic marker and the type thereof changes and/or when the magnetic sensor whose output is destined for the arithmetic processing is changed over at the time when the installation height of the magnetic sensor changes relative to the magnetic marker, there makes appearance noticeable error in the arithmetically determined value of the motor vehicle position.

SUMMARY OF THE INVENTION

In the light of the state of the art described above, it is an object of the present invention to provide a motor vehicle position recognizing system which can ensure high accuracy for the arithmetic processing for determining the vehicle position in the transverse direction by minimizing the error of the arithmetically determined value by providing a vehicle position correcting means for preventing or suppressing occurrence of the discontinuity even when the magnetic sensor whose output is destined for the arithmetic processing for determining the vehicle position is changed over.

In view of the above and other objects which will become apparent as the description proceeds, there is provided according to a general aspect of the present invention a motor vehicle position recognizing system which includes a signal zone forming means laid on a road surface at least at one predetermined location for forming a signal zone of a predetermined signal strength, a plurality of signal strength detecting means mounted on a motor vehicle traveling on the road surface and disposed at a plurality of positions along a transverse direction substantially orthogonal to a traveling direction of the motor vehicle for detecting the signal strength of the signal zone, a vehicle position arithmetic means for arithmetically determining a position of the motor vehicle in a transverse direction as a vehicle position on the basis of the signal strength detected by at least one of the plural signal strength detecting means, a detecting means changeover means for changing over the signal strength detecting means whose output is used for an arithmetic operation for determining the vehicle position in dependence on maneuvering of the motor vehicle, and a vehicle position correcting means for correcting an arithmetically determined value of the position of the motor vehicle as determined arithmetically by the vehicle position arithmetic means in response to the changeover operation of the signal strength detecting means.

In a preferred mode for carrying out the invention, the vehicle position correcting means may be so designed as to correct the arithmetically determined value of the position of the motor vehicle in response to the changeover operation of the signal strength detecting means so that the arithmetically determined values of the positions of the motor vehicle as determined arithmetically before and after the changeover of the signal strength detecting means, respectively, assume substantially midpoints between arithmetically determined values based on the signal strengths detected by the individual signal strength detecting means before and after the changeover of the signal strength detecting means, respectively.

In another preferred mode for carrying out the invention, the vehicle position correcting means may be so designed as to correct the arithmetically determined value of the position of the motor vehicle so that coincidence is found among the vehicle positions determined on the basis of the detection signal strengths, respectively, when coincidence is detected among detection signal strengths derived from the outputs of the plural signal strength detecting means, respectively.

In yet another preferred mode for carrying out the invention, the signal zone forming means may be constituted by magnetic markers for generating magnetic fields of a predetermined intensity, and the plurality of signal strength detecting means may be constituted by a plurality of magnetic sensors for detecting the magnetic field intensities.

In still another preferred mode for carrying out the invention, the vehicle position correcting means may be so designed as to correct the arithmetically determined value of the position of the motor vehicle in response to the magnetic sensor changeover operation performed by the detecting means changeover means so that the arithmetically determined values of the positions of the motor vehicle as determined arithmetically before and after the changeover of the magnetic sensors, respectively, assume midpoints between arithmetically determined values based on the signal strengths detected by the magnetic sensors before and after the changeover of the magnetic sensors, respectively.

In a further preferred mode for carrying out the invention, the vehicle position correcting means may be so designed as to correct the arithmetically determined value of the position of the motor vehicle so that coincidence is found among the vehicle positions determined on the basis of the detected magnetic field intensities, respectively, when coincidence is detected among the detected magnetic field intensities derived from the outputs of the plurality of magnetic sensors, respectively.

In a yet further preferred mode for carrying out the invention, the plurality of magnetic sensors may be so designed as to detect magnetic field intensity in a vertical direction of the motor vehicle, and the vehicle position correcting means may be so designed as to correct the arithmetically determined value of the position of the motor vehicle so that coincidence is found among the vehicle positions determined on the basis of the detected magnetic field intensities detected by the plurality of magnetic sensors, respectively, when coincidence is detected among the vertical field intensities derived from the outputs of the plurality of magnetic sensors, respectively.

In a still further preferred mode for carrying out the invention, the motor vehicle position recognizing system further may further include a fault decision means for determining a fault of the magnetic sensor, wherein the fault decision means may be so designed as to determine that the magnetic sensor suffers a fault when the arithmetically determined values of the position of the motor vehicle differ at least by a predetermined value notwithstanding that coincidence is found among the detected vertical field magnetic intensities before and after changeover of the magnetic sensors.

In a mode for carrying out the invention, the plurality of magnetic sensors should preferably be so designed as to detect magnetic field intensity in a horizontal direction of the motor vehicle, and the vehicle position correcting means should preferably be so designed as to correct the arithmetically determined value of the position of the motor vehicle so that coincidence is found among the vehicle positions determined on the basis of the detected magnetic field intensities as detected by the plurality of magnetic sensors, respectively, when coincidence is detected among the horizontal field intensities derived from the outputs of the plurality of magnetic sensors, respectively.

In another mode for carrying out the invention, the motor vehicle position recognizing system should preferably include further a fault decision means for determining a fault of the magnetic sensor, wherein the fault decision means may be so designed as to determine that the magnetic sensor suffers a fault when the arithmetically determined values of the position of the motor vehicle differ at least by a predetermined value notwithstanding that coincidence is found among the detected horizontal field magnetic intensities before and after changeover of the magnetic sensors.

In yet another mode for carrying out the invention, the vehicle position correcting means should preferably be so designed that when the magnetic marker exists underneath one of the plural magnetic sensors, the vehicle position correcting means corrects the arithmetically determined value of the vehicle position such that the vehicle position determined on the basis of the detected field intensity derived from the output of the one magnetic sensor coincides with the vehicle position determined on the basis of the detected field intensity derived from the output of the magnetic sensor located adjacent to the above-mentioned one magnetic sensor.

In still another mode for carrying out the invention, the plurality of magnetic sensors may preferably be so designed as to detect magnetic field intensity in the horizontal direction of the motor vehicle, and the vehicle position correcting means may preferably be so designed that unless the horizontal field intensity is determined by one of the plurality of magnetic sensors, the vehicle position correcting means decides that the magnetic marker exists underneath the above-mentioned one magnetic sensor.

In a further mode for carrying out the invention, the motor vehicle position recognizing system should preferably be so arranged that when the position of the magnetic marker as arithmetically determined on the basis of the detected field intensity derived from the output of one of the plurality of magnetic sensors coincides with the position of the one magnetic marker, it is then decided that the magnetic marker exists underneath the above-mentioned one magnetic sensor.

In a yet further mode for carrying out the invention, the vehicle position arithmetic means may preferably be so designed that when the magnetic marker exists underneath the one magnetic sensor, the vehicle position arithmetic means arithmetically determines the correction factor so that the arithmetically determined value of the vehicle position as determined arithmetically on the basis of the field intensity detected by the magnetic sensor located adjacent to the above-mentioned one magnetic sensor coincides with a distance between the magnetic sensors.

In a still further mode for carrying out the invention, the motor vehicle position recognizing system may further include a fault decision means for making decision as to whether the magnetic sensor suffers a fault, wherein the fault decision means may be so designed as to decide that the magnetic sensor suffers a fault when the correction factor departs from a predetermined value range.

In another mode for carrying out the invention, the vehicle position correcting means should preferably be so designed as to correct the arithmetically determined value of the vehicle position such that the vehicle positions determined arithmetically on the basis of the detected field intensities derived from the outputs of the plurality of magnetic sensors, respectively, coincide with one another.

In yet another mode for carrying out the invention, the vehicle position arithmetic means should preferably be so designed as to arithmetically determined the correction factor such that a sum of absolute values of the arithmetically determined values of the vehicle positions determined on the basis of the detected field intensities derived, respectively, from the outputs of two of the plurality of magnetic sensors coincides with the distance between the above-mentioned magnetic sensors.

In still another mode for carrying out the invention, the motor vehicle position recognizing system may further include a fault decision means for making decision as to whether the magnetic sensor suffers a fault, and the fault decision means may be so designed as to decide that the magnetic sensor suffers a fault when the correction factor departs from a predetermined value range.

By virtue of the arrangements described above of the motor vehicle position recognizing system according to the present invention, the motor vehicle position recognizing system can ensure high accuracy for the arithmetic operation for determining the vehicle position in the transverse direction by minimizing the error otherwise involved in the arithmetic processing by providing the vehicle position correcting means for preventing or at least suppressing occurrence of the discontinuity even when the magnetic sensor whose output is destined for the arithmetic processing for determining the vehicle position is changed over to another one. Besides, it is possible to make decision as to whether or not the magnetic sensor suffers a fault, to another advantage.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

The present invention will be described in detail in conjunction with what is presently considered as preferred or typical embodiments thereof by reference to the drawings. In the following description, like reference characters designate like or corresponding parts throughout the several views. Also in the following description, it is to be understood that such terms as "left", "right", "transverse", "horizontal", "vertical" and the like are words of convenience and are not to be construed as limiting terms.

Embodiment 1

Now, the motor vehicle position recognizing system according to a first embodiment of the present invention will be described in detail by reference to the drawings.

Figure 1:
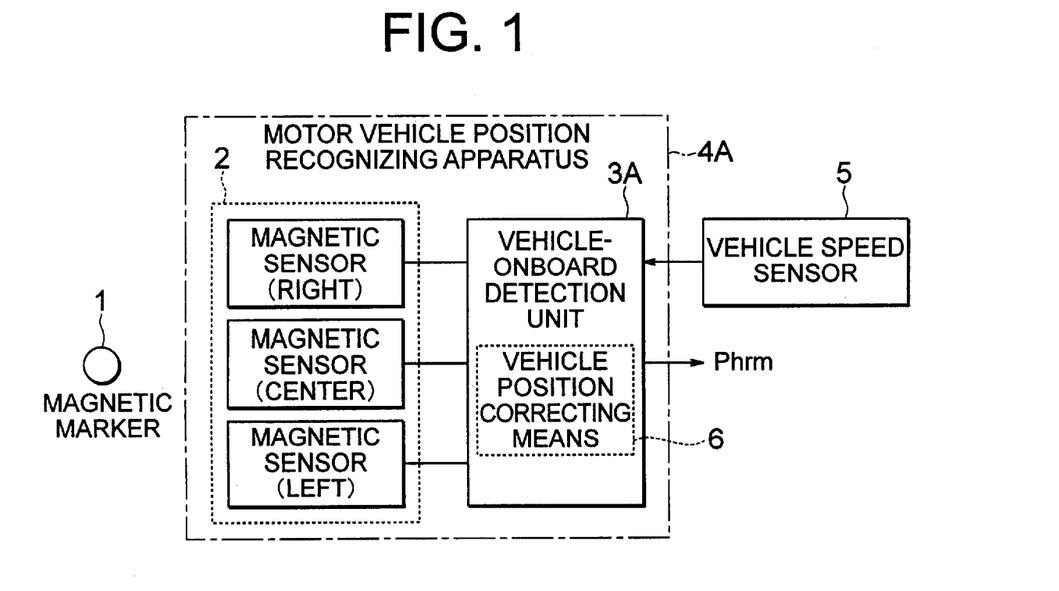
FIG. 1 is a block diagram showing generally and schematically a configuration of a motor vehicle position recognizing system according to a first embodiment of the present invention.

FIG. 1 is a block diagram showing generally and schematically a configuration of the motor vehicle position recognizing system according to the first embodiment of the invention, wherein same or like components as those described hereinbefore by reference to FIG. 7 are denoted by like reference numerals, being affixed with "A" as the case may be.

It should first be mentioned that the output characteristics of the magnetic sensor 2 and the basic processing operation of the vehicle-onboard detection unit 3A are essentially same as described hereinbefore by reference to FIGS. 8 to 11.

Referring to FIG. 1, the vehicle-onboard detection unit 3A includes not only the means mentioned hereinbefore, i.e., the vehicle position arithmetic means for arithmetically determining the position of the motor vehicle in the transverse direction relative to the magnetic marker 1 and the detecting means changeover means for changing over the magnetic sensor 2 whose output is destined to be arithmetically processed (hereinafter also referred to as the processing-subjected magnetic sensor only for convenience of description) to another one, but also a vehicle position correcting means 6 in addition.

The vehicle position correcting means 6 is designed to respond to the magnetic sensor changeover operation performed by the detecting means changeover means to thereby correct the vehicle position arithmetically determined by the vehicle position arithmetic means. Thus, the vehicle-onboard detection unit 3A outputs a corrected vehicle position Phrm in the transverse direction as the arithmetically determined value.

Figure 2:
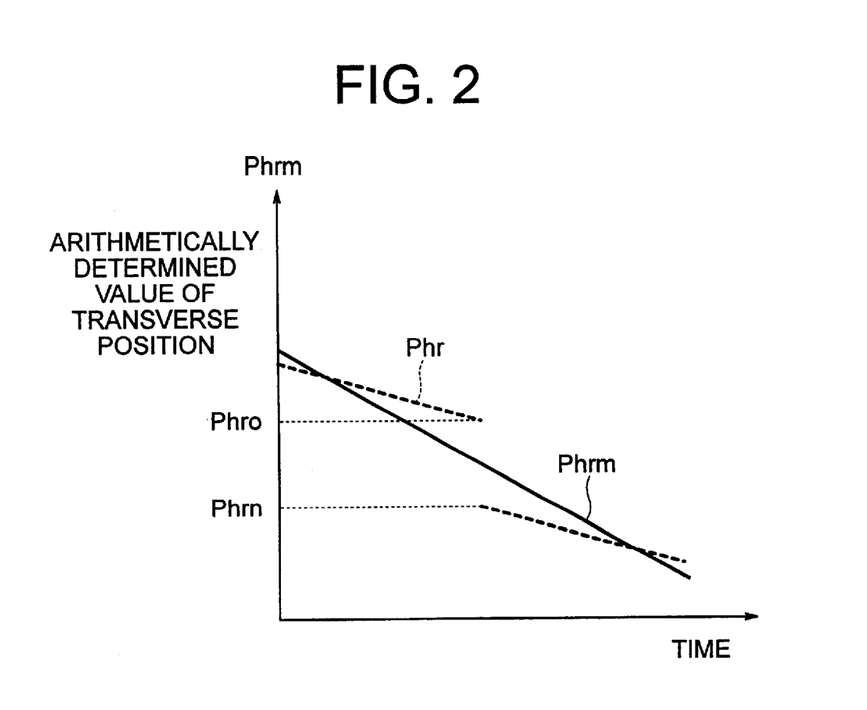
FIG. 2 is a view for illustrating a time-dependent change (see a solid line) of an arithmetically determined value of a motor vehicle position in a transverse direction after arithmetic correction processing upon changeover of magnetic sensors in the motor vehicle position recognizing system according to the first embodiment of the invention.

Next, referring to FIG. 2, description will generally be made of the operation of the motor vehicle position recognizing system according to the first embodiment of the invention shown in FIG. 1. FIG. 2 is a view for graphically illustrating the processing operation in the case where the processing-subjected magnetic sensor 2 is changed over in the course of time lapse (i.e., in the course of traveling of the motor vehicle) and shows the arithmetically determined value Phr of the transverse position before the correction (see broken lines) and the arithmetically determined value Phrm of the transverse position after the correction (see the solid lines).

Referring to FIG. 2, when the processing-subjected magnetic sensor 2 (i.e., the sensor whose output is destined to be processed) is changed over in the course of time lapse or in the course of traveling, a discontinuity makes appearance in the arithmetically determined value Phr of the transverse position before the correction (see the broken lines), as described hereinbefore in conjunction with conventional motor vehicle position recognizing system.

More specifically, there makes appearance as the discontinuity of maximum magnitude the difference between the arithmetically determined value Phro of the transverse position before the last correction in precedence to the changeover of the processing-subjected magnetic sensor 2 and the arithmetically determined value Phrn of the transverse position before the first correction succeeding to the changeover of the processing-subjected magnetic sensor 2.

Thus, with a view to preventing occurrence of such discontinuity, the vehicle position correcting means 6 incorporated in the vehicle-onboard detection unit 3A of the motor vehicle position recognizing system according to the instant embodiment determines at first the arithmetically determined value Phrm in the transverse position after the correction (i.e., the positional deviation of the motor vehicle center from the lane center in the transverse direction) on the basis of the arithmetically determined value Phro immediately before the changeover of the magnetic sensors 2 and the arithmetically determined value Phrn immediately after the changeover of the sensors in accordance with the following expression (4):

$$Phrm = Phm + Os + Or \qquad (4)$$

where

Os represents the offset quantity of the processing-subjected magnetic sensor 2 from the vehicle center, Or represents the offset quantity of the marker row, and Phm represents the corrected positional deviation of the magnetic sensor 2 relative to the magnetic marker 1 in the transverse direction, wherein Phm is given by the following expression:

$$Phm = a \cdot Ph \qquad (5)$$

where a correction factor or coefficient a of the above expression can be determined in accordance with the following expression (6):

$$a = \{(Phro - Phrn)/2 + Ph\}/Ph \qquad (6)$$

Consequently, the aforementioned expression (4) can be rewritten as follows:

$$Phrm = (Phro - Phrn)/2 + Ph + Os + Or \quad (7)$$

The time characteristics of the arithmetically determined value Phrm of the transverse position after the correction which is calculated in accordance with the expression (7) mentioned just above behaves as represented by the solid line shown in FIG. 2. It can be seen that no discontinuity makes appearance in this solid line (Phrm), differing from the arithmetically determined value Phr of the transverse position before the correction (represented by the broken lines).

By providing the vehicle position correcting means 6 for correcting the arithmetically determined value Phr of the transverse position of the relevant motor vehicle to thereby determine the value Phrm of the transverse position undergone the correction, it is now possible to prevent occurrence of the discontinuity upon changeover of the processing-subjected magnetic sensors 2, as a result of which the transverse position Phrm of the motor vehicle concerned can be determined with high accuracy and reliability, to a great advantage.

Further, the vehicle position correcting means 6 is so designed as to calculate the arithmetically determined value Phrm of the transverse position which has undergone the correction so that it assumes a midpoint of the arithmetically determined values Phro and Phrn of the transverse positions, respectively, which have not been corrected yet, before and after the changeover of the magnetic sensors 2, as can be seen from the above-mentioned expression (7). Thus, the arithmetically determined value of the transverse position of the motor vehicle can be corrected extremely easily, to another advantage.

In the calculation of the corrected value described above, no filter processing or the like is required. Thus, no time lag is involved in obtaining the arithmetically determined value of the transverse position. This in turn means that high reliability can be ensured for the automatic steering control and the lane departure alarming function, to a further advantage.

In the foregoing, it has been presumed that each of the arithmetically determined values Phro and Phrn of the transverse positions before and after the changeover of the processing-subjected magnetic sensors 2, respectively, is arithmetically corrected at one point. It should however be appreciated that such arithmetic correction may be performed at plural points before and after the changeover of the processing-subjected magnetic sensors 2 with a view to avoiding the influence of dispersion or variance of the arithmetically determined values Phro and Phrn of the transverse positions, respectively.

Embodiment 2

In the foregoing description of the motor vehicle position recognizing system according to the first embodiment of the invention, no consideration has been paid to the arithmetic processing involved in the changeover of the processing-subjected magnetic sensors 2. A second embodiment of the present invention is directed to suppression of variation of the output signal strengths (vertical field intensities and horizontal field intensities) upon changing-over of the magnetic sensors 2.

Figure 3:
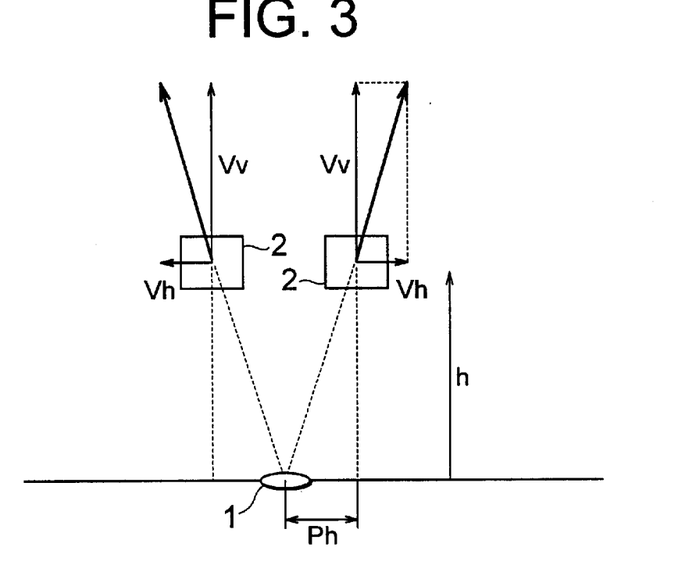
FIG. 3 is a view for illustrating an arithmetic correction processing performed by a vehicle position correcting means upon changeover of the magnetic sensors in the motor vehicle position recognizing system according to a second embodiment of the present invention upon changeover of magnetic sensors.
Figure 4:
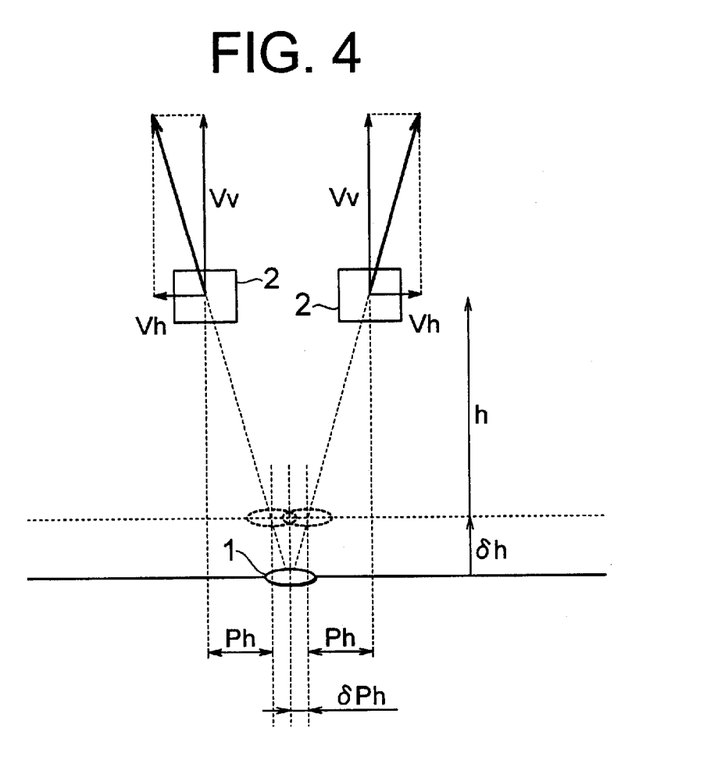
FIG. 4 is a view for illustrating another example of the arithmetic correction processing performed by the vehicle position correcting means upon changeover of the magnetic sensors in the motor vehicle position recognizing system according to the second embodiment of the present invention.

FIGS. 3 and 4 are views for graphically illustrating the arithmetic processing operations performed by the vehicle position correcting means 6 of the motor vehicle position recognizing system according to the second embodiment of the invention and show the positional relationship between the magnetic marker 1 and the magnetic sensors 2 when the magnetic sensors 2 are changed over.

More specifically, FIG. 3 shows the case where no error exists in the heightwise direction while FIG. 4 shows the case where an error or deviation δh exists in the heightwise direction. In both cases, a pair of magnetic sensors 2 are shown which are disposed so that the center positions thereof differ in the transverse direction.

In the case of the situation shown in FIG. 3, the output signal strengths (vertical field intensities and horizontal field intensities) of the magnetic sensor 2 remains unchanged without bringing about any noticeable error in the arithmetic processing operation upon changing-over of the processing-subjected magnetic sensor 2, because the magnetic sensors 2 are so disposed that the center positions thereof differ from each other in the transverse direction.

On the other hand, in the case of the situation illustrated in FIG. 4, the position of the magnetic marker 1 in appearance (see phantom images) becomes different for the output signals of the magnetic sensors 2, respectively, when the magnetic sensors 2 are changed over to each other.

At this juncture, the vehicle position correcting means 6 is so designed that when the peak vertical field intensity values Vv outputted from the two magnetic sensors 2 are same, the correction factor a is arithmetically determined in accordance with the undermentioned expression (8) so that the transverse positions indicated by the output signals of the magnetic sensors 2 are identical with each other and assume the center position or mid position of the distance W between these magnetic sensors.

$$a = W/(2 \times Ph) \quad (8)$$

Thus, from the expressions (4) and (5) mentioned hereinbefore and the expression (8) mentioned just above, the arithmetically determined value Phrm of the transverse position after the correction can be expressed as follows:

$$Phrm = W/2 + Os + Or \quad (4\text{-}1)$$

By using the expression (8) mentioned above, correction of the arithmetically determined value of the transverse position can further be facilitated. Of course, the advantageous effects mentioned previously can equally be obtained.

Besides, when the arithmetically determined value of the transverse position becomes remarkably different notwithstanding the peak vertical field intensity values Vv are same before and after the changeover of the magnetic sensors 2 are same or when the arithmetically determined value of the transverse position becomes remarkably different notwithstanding the peak horizontal field intensity values Vh are same, it can then be decided that the magnetic sensor 2 suffers a fault.

In the foregoing description, the vertical field intensity is made use of for correcting the arithmetically determined value of the transverse position. It should however be appreciated that the horizontal field intensity may equally be used essentially to the same effect or both the vertical field intensity and the horizontal field intensity may also be used. In other words, correction may be so carried out that when the vertical field intensities (or the horizontal field intensities) obtained with the two magnetic sensors 2, respectively, coincide with each other, the vehicle positions determined on the basis of these magnetic field intensities, respectively, coincide with each other.

Embodiment 3

In the description of the first and second embodiments of the invention, no consideration has been paid to the case where the magnetic marker 1 is disposed immediately beneath the processing-subjected magnetic sensor 2. A third embodiment of the present invention is concerned with the arithmetic correction processing in the case where the magnetic marker 1 is disposed immediately beneath the magnetic sensor.

Figure 5:
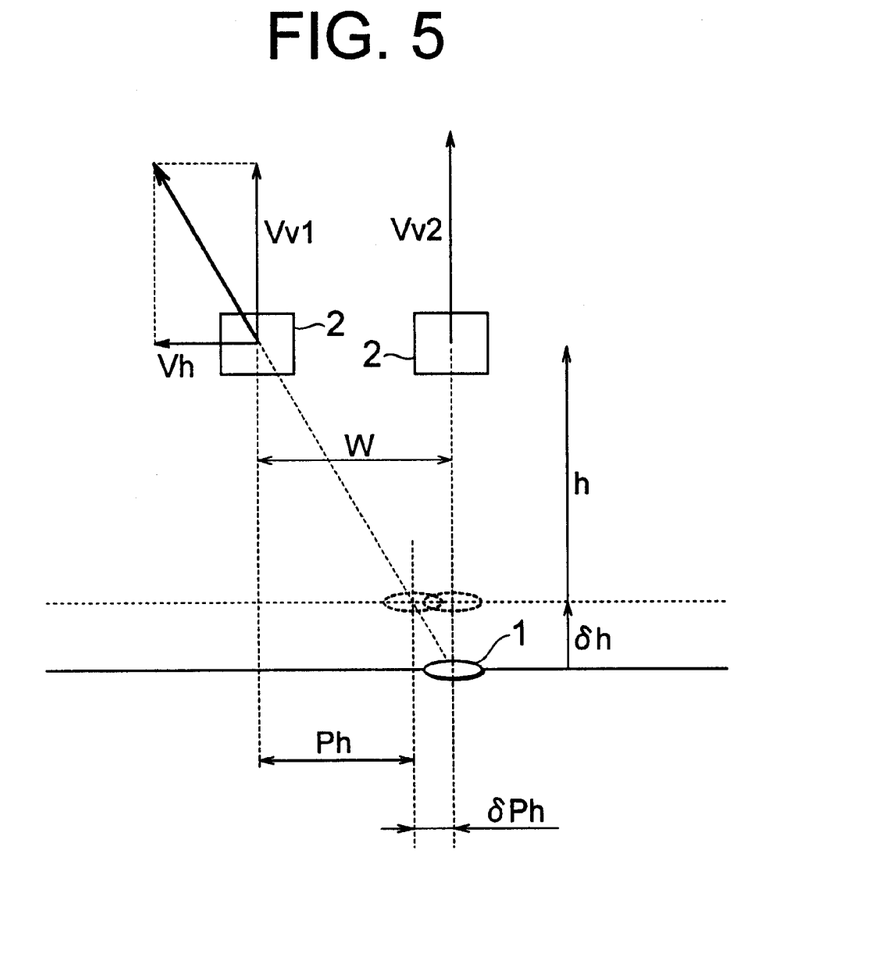
FIG. 5 is a view for illustrating an arithmetic correction processing performed by a vehicle position correcting means in the motor vehicle position recognizing system according to a third embodiment of the present invention.

FIG. 5 is a view for graphically illustrating the arithmetic processing operation performed by the vehicle position correcting means 6 of the motor vehicle position recognizing system according to the third embodiment of the present invention on the presumption that the magnetic marker 1 is disposed immediately underneath the magnetic sensor 2 disposed on the right side as viewed in the figure with error δh making appearance in the heightwise direction.

Referring to FIG. 5, the magnetic sensor 2 disposed on the right-hand side as viewed in the figure outputs only the vertical field intensity signal without outputting the horizontal field intensity signal regardless of presence or absence of the error δh in the heightwise direction.

As a result of this, the magnetic marker 1 disposed immediately beneath or underneath the processing-subjected magnetic sensor 2 is capable of making it possible to detect the transverse position of the concerned motor vehicle with extremely high accuracy. Accordingly, it is desirable to correct the arithmetically determined value of the transverse position by taking advantage of this feature.

Thus, when the arithmetically determined value of the transverse position indicates that the magnetic marker is located immediately beneath or underneath the processing-subjected magnetic sensor 2, then the correction factor a is arithmetically determined in accordance with the undermentioned expression (9) so that the position Ph in the transverse direction derived from the output of the magnetic sensor 2 located adjacent to the processing-subjected magnetic sensor 2 conforms with the distance W between the magnetic sensors.

$$a = W/Ph \tag{9}$$

Thus, from the expressions (4) and (5) mentioned hereinbefore and the above-mentioned expression (9), the arithmetically determined value Phrm of the transverse position after the correction can be expressed as follows:

$$Phrm = W + Os + Or \tag{4-2}$$

By using the expression (9) mentioned above, correction of the arithmetically determined value of the transverse position can further be facilitated in addition to the advantageous effects mentioned previously.

In other words, unless the horizontal field intensity signal can be obtained from the magnetic sensor 2, it is then decided that the magnetic marker 1 exists immediately beneath or underneath this magnetic sensor 2, and thus the vehicle position determined on the basis of the output of the magnetic sensor 2 located adjacent to the above mentioned magnetic sensor 2 can be corrected so as to coincide with the position of the magnetic marker 1.

In this case, very high accuracy can be ensured for the positional correction, whereby the corrected arithmetic value can be determined with further enhanced accuracy.

Additionally, by making decision as to whether or not the correction factor a lies within a predetermined value range, it is possible to determine defectiveness or fault of the magnetic sensor 2 without difficulty when the correction factor a departs from the predetermined value range mentioned above.

Besides, disposition of the magnetic marker 1 immediately beneath the magnetic sensor 2 can be determined extremely easily only on the basis of no availability of the horizontal field intensity signal.

Although it has been described above that the disposition of the magnetic marker 1 immediately beneath or underneath the magnetic sensor 2 is decided on the basis of presence or absence of the horizontal field intensity signal, it should be appreciated that the disposition of the magnetic marker 1 immediately beneath or underneath the magnetic sensor 2 may be determined equally when the arithmetically determined value of the transverse position based on the magnetic field intensity signal derived from the output of the magnetic sensor 2 conforms with the position of the magnetic sensor 2.

Namely, when the position of the magnetic marker 1 determined arithmetically on the basis of the output signal of the magnetic sensor 2 coincides with the position of the magnetic sensor 2, it can then be decided that the magnetic marker 1 is located immediately beneath that magnetic sensor 2.

By using the correction factor a on the basis of the expression (9) mentioned above, correction of the arithmetically determined value of the transverse position can be much facilitated.

Embodiment 4

In the case of the motor vehicle position recognizing system according to the third embodiment of the invention described above, correction of the arithmetically determined value of the transverse position is performed only when the magnetic marker 1 is disposed immediately beneath the magnetic sensor 2. With a fourth embodiment of the present invention, it is contemplated to perform correction of the arithmetically determined value of the transverse position regardless of the positional conditions of the magnetic marker 1.

Figure 6:
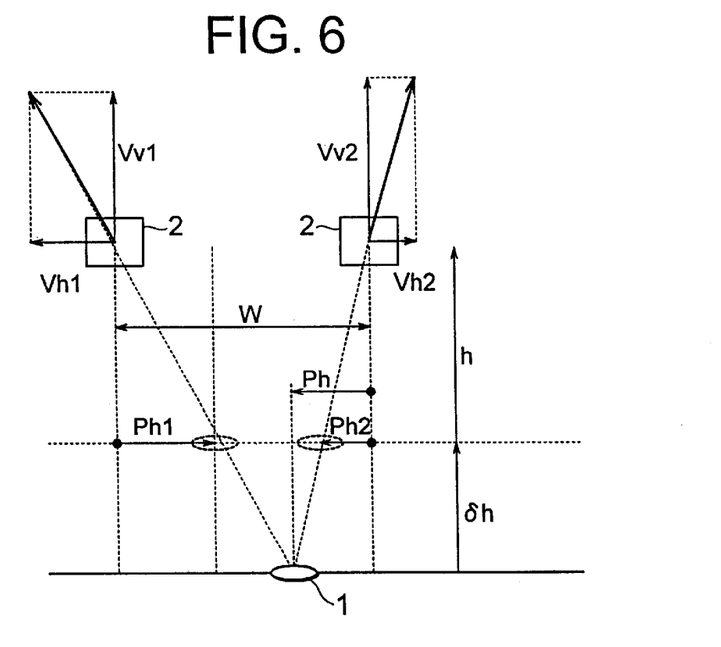
FIG. 6 is a view for illustrating an arithmetic correction processing performed by a vehicle position correcting means in the motor vehicle position recognizing system according to a fourth embodiment of the present invention.

FIG. 6 is a view for graphically illustrating the arithmetic processing operation of the vehicle position correcting means 6 of the motor vehicle position recognizing system according to the fourth embodiment on the presumption that error δh makes appearance in the heightwise direction.

More specifically, it is assumed that for the actual position Ph of the motor vehicle in the transverse direction, an arithmetically determined value Ph2 of the transverse position is determined on the basis of the output of the magnetic sensor 2 disposed on the right-hand side as viewed in FIG. 6 and that an arithmetically determined value Ph1 of the transverse position is determined on the basis of the output of the magnetic sensor 2 disposed on the left-hand side as viewed in the figure.

Intrinsically, the absolute value sum of the arithmetically determined values (deviations) Ph1 and Ph2 based on the outputs of two magnetic sensors 2 (where the absolute value sum is given by |Ph1|+|Ph2|) should coincide with the distance W between the magnetic sensors. However, when error δh makes appearance heightwise, as illustrated in FIG. 6, both the arithmetically determined values in the transverse position do not coincide with each other.

Accordingly, in that case, the correction factor a is arithmetically determined in accordance with the undermentioned expression (10) so that the absolute value sum of the arithmetically determined values (i.e., |Ph1|+|Ph2|) coincides with the distance W between the magnetic sensors.

$$a = W/(Ph1 - Ph2) \tag{10}$$

By adopting the above expression (10), correction of the arithmetically determined value of the transverse position can be realized extremely easily regardless of the relative positions between the magnetic marker 1 and the magnetic sensors 2. Of course, the advantageous effects mentioned hereinbefore can equally be assured.

To say in another way, the arithmetic correction operation is performed every time the magnetic marker 1 is detected instead of carrying out the correction processing only when the specific positional relationship (vertically alignment) between the magnetic marker 1 and the magnetic sensor 2 is satisfied, whereby the correction arithmetic operation can be executed speedily with high reliability. Thus, the corrected value of very high accuracy can be made available.

In this case, defectiveness or fault of the magnetic sensor 2 can be detected when the correction factor a departs from a predetermined value range.

In the motor vehicle position recognizing system according to the first to fourth embodiments of the invention, the magnetic marker 1 for generating or forming the predetermined magnetic field and the magnetic sensor 2 for detecting the magnetic field intensity are employed as the signal zone forming means laid on the road surface and the signal strength detecting means mounted on the motor vehicle. It goes however without saying that other equivalent means may be adopted to the substantially same effects.

By way of example, an electric field generating means and an electric field detecting means may be employed as the signal zone forming means and the signal strength detecting means, respectively. Alternatively, an electromagnetic wave (light) generating means and an electromagnetic wave receiving (light receiving) means may be employed as the electric field generating means and the electric field detecting means, respectively.

Many modifications and variations of the present invention are possible in the light of the above techniques. It is therefore to be understood that within the scope of the appended claims, the invention may be practiced otherwise than as specifically described.

What is claimed is:

1. A motor vehicle position recognizing system, comprising:

signal zone forming means laid on a road surface at least at one predetermined location for forming a signal zone of a predetermined signal strength;

a plurality of signal strength detecting means mounted on a motor vehicle traveling on said road surface and disposed at a plurality of positions along a transverse direction substantially orthogonal to a traveling direction of said motor vehicle for detecting the signal strength of said signal zone;

vehicle position arithmetic means for arithmetically determining a position of said motor vehicle in a transverse direction as a vehicle position on the basis of the signal strength detected by at least one of said plural signal strength detecting means;

detecting means changeover means for changing over from one of the plurality of signal strength detecting means whose output is used for an arithmetic operation for determining said vehicle position depending on a maneuvering of said motor vehicle, to another one of the plurality of signal strength detecting means; and vehicle position correcting means for correcting an arithmetically determined value of the position of said motor vehicle as determined arithmetically by said vehicle position arithmetic means in response to the changeover operation.

2. The system according to claim 1, wherein said another one of the plurality of signal strength detecting means determines said vehicle position in substantially the same manner as said one of the plurality of signal strength detecting means.

3. A motor vehicle position recognizing system, comprising:

signal zone forming means laid on a road surface at least at one predetermined location for forming a signal zone of a predetermined signal strength;

a plurality of signal strength detecting means mounted on a motor vehicle traveling on said road surface and disposed at a plurality of positions along a transverse direction substantially orthogonal to a traveling direction of said motor vehicle for detecting the signal strength of said signal zone;

vehicle position arithmetic means for arithmetically determining a position of said motor vehicle in a transverse direction as a vehicle position on the basis of the signal strength detected by at least one of said plural signal strength detecting means;

detecting means changeover means for changing over the signal strength detecting means whose output is used for an arithmetic operation for determining said vehicle position depending on a maneuvering of said motor vehicle; and vehicle position correcting means for correcting an arithmetically determined value of the position of said motor vehicle as determined arithmetically by said vehicle position arithmetic means in response to the changeover operation of said signal strength detecting means, wherein said vehicle position correcting means is so designed as to correct the arithmetically determined value of the position of said motor vehicle in response to the changeover operation of said signal strength detecting means so that the arithmetically determined values of the positions of said motor vehicle as determined arithmetically before and after said changeover of said signal strength detecting means, respectively, assume substantially midpoints between arithmetically determined values based on the signal strengths detected by said individual signal strength detecting means before and after the changeover of said signal strength detecting means, respectively.

4. A motor vehicle position recognizing system, comprising:

signal zone forming means laid on a road surface at least at one predetermined location for forming a signal zone of a predetermined signal strength;

a plurality of signal strength detecting means mounted on a motor vehicle traveling on said road surface and disposed at a plurality of positions along a transverse direction substantially orthogonal to a traveling direction of said motor vehicle for detecting the signal strength of said signal zone;

vehicle position arithmetic means for arithmetically determining a position of said motor vehicle in a transverse direction as a vehicle position on the basis of the signal strength detected by at least one of said plural signal strength detecting means;

detecting means changeover means for changing over the signal strength detecting means whose output is used for an arithmetic operation for determining said vehicle position depending on a maneuvering of said motor vehicle; and vehicle position correcting means for correcting an arithmetically determined value of the position of said motor vehicle as determined arithmetically by said vehicle position arithmetic means in response to the changeover operation of said signal strength detecting means, wherein said vehicle position correcting means is so designed as to correct said arithmetically determined value of the position of said motor vehicle so that coincidence is found among said vehicle positions determined on the basis of said detection signal strengths, respectively, when coincidence is detected among detection signal strengths derived from the outputs of said plural signal strength detecting means, respectively.

5. A motor vehicle position recognizing system, comprising:

signal zone forming means laid on a road surface at least at one predetermined location for forming a signal zone of a predetermined signal strength;

a plurality of signal strength detecting means mounted on a motor vehicle traveling on said road surface and disposed at a plurality of positions along a transverse direction substantially orthogonal to a traveling direction of said motor vehicle for detecting the signal strength of said signal zone;

vehicle position arithmetic means for arithmetically determining a position of said motor vehicle in a transverse direction as a vehicle position on the basis of the signal strength detected by at least one of said plural signal strength detecting means;

detecting means changeover means for changing over the signal strength detecting means whose output is used for an arithmetic operation for determining said vehicle position depending on a maneuvering of said motor vehicle; and vehicle position correcting means for correcting an arithmetically determined value of the position of said motor vehicle as determined arithmetically by said vehicle position arithmetic means in response to the changeover operation of said signal strength detecting means, wherein said signal zone forming means is constituted by magnetic markers for generating magnetic fields of a predetermined intensity, and wherein said plurality of signal strength detecting means are constituted by a plurality of magnetic sensors for detecting said magnetic field intensities.

6. A motor vehicle position recognizing system according to claim 5, wherein said vehicle position correcting means is so designed as to correct the arithmetically determined value of the position of said motor vehicle in response to the magnetic sensor changeover operation performed by said detecting means changeover means so that the arithmetically determined values of the positions of said motor vehicle as determined arithmetically before and after said changeover of said magnetic sensors, respectively, assume midpoints between arithmetically determined values based on the signal strengths detected by said magnetic sensors before and after the changeover of said magnetic sensors, respectively.

7. A motor vehicle position recognizing system according to claim 5, wherein said vehicle position correcting means is so designed as to correct said arithmetically determined value of the position of said motor vehicle so that coincidence is found among said vehicle positions determined on the basis of said detected magnetic field intensities, respectively, when coincidence is detected among the detected magnetic field intensities derived from the outputs of said plurality of magnetic sensors, respectively.

8. A motor vehicle position recognizing system according to claim 7, wherein said plurality of magnetic sensors are so designed as to detect magnetic field intensity in a vertical direction of said motor vehicle, and wherein said vehicle position correcting means is so designed as to correct said arithmetically determined value of the position of said motor vehicle so that coincidence is found among the vehicle positions determined on the basis of the detected magnetic field intensities detected by said plurality of magnetic sensors, respectively, when coincidence is detected among the vertical field intensities derived from the outputs of said plurality of magnetic sensors, respectively.

9. A motor vehicle position recognizing system according to claim 8, further comprising:

fault decision means for determining a fault of said magnetic sensor, wherein said fault decision means is so designed as to determine that said magnetic sensor suffers a fault when the arithmetically determined values of the position of said motor vehicle differ at least by a predetermined value notwithstanding that coincidence is found among said detected vertical field magnetic intensities before and after changeover of said magnetic sensors.

10. A motor vehicle position recognizing system according to claim 7, wherein said plurality of magnetic sensors are so designed as to detect magnetic field intensity in a horizontal direction of said motor vehicle, and wherein said vehicle position correcting means is so designed as to correct said arithmetically determined value of the position of said motor vehicle so that coincidence is found among the vehicle positions determined on the basis of the detected magnetic field intensities as detected by said plurality of magnetic sensors, respectively, when coincidence is detected among the horizontal field intensities derived from the outputs of said plurality of magnetic sensors, respectively.

11. A motor vehicle position recognizing system according to claim 10, further comprising:

fault decision means for determining a fault of said magnetic sensor, wherein said fault decision means is so designed as to determine that said magnetic sensor suffers a fault when the arithmetically determined values of the position of said motor vehicle differ at least by a predetermined value notwithstanding that coincidence is found among said detected horizontal field magnetic intensities before and after changeover of said magnetic sensors.

12. A motor vehicle position recognizing system according to claim 5, wherein said vehicle position correcting means is so designed that when said magnetic marker exists underneath one of said plural magnetic sensors, said vehicle position correcting means corrects the arithmetically determined value of said vehicle position such that the vehicle position determined on the basis of the detected field intensity derived from the output of said one magnetic sensor coincides with the vehicle position determined on the basis of the detected field intensity derived from the output of the magnetic sensor located adjacent to said one magnetic sensor.

13. A motor vehicle position recognizing system according to claim 12, said plurality of magnetic sensors being so designed as to detect magnetic field intensity in the horizontal direction of said motor vehicle, wherein said vehicle position correcting means is so designed that unless the horizontal field intensity is determined by one of said plurality of magnetic sensors, said vehicle position correcting means decides that said magnetic marker exists underneath said one magnetic sensor.

14. A motor vehicle position recognizing system according to claim 12, wherein when the position of said magnetic marker as arithmetically determined on the basis of the detected field intensity derived from the output of one of said plurality of magnetic sensors coincides with the position of said one magnetic marker, decision is made that said magnetic marker exists underneath said one magnetic sensor.

15. A motor vehicle position recognizing system according to claim 12, wherein said vehicle position arithmetic means is so designed that when said magnetic marker exists underneath said one magnetic sensor, said vehicle position arithmetic means arithmetically determines the correction factor so that the arithmetically determined value of said vehicle position as determined arithmetically on the basis of the field intensity detected by the magnetic sensor located adjacent to said one magnetic sensor coincides with a distance between said magnetic sensors.

16. A motor vehicle position recognizing system according to claim 15, further comprising:

fault decision means for making decision as to whether said magnetic sensor suffers a fault, wherein said fault decision means is so designed as to decide that said magnetic sensor suffers a fault when said correction factor departs from a predetermined value range.

17. A motor vehicle position recognizing system according to claim 15, wherein said vehicle position correcting means is so designed as to correct the arithmetically determined value of the vehicle position such that the vehicle positions determined arithmetically on the basis of the detected field intensities derived from the outputs of said plurality of magnetic sensors, respectively, coincide with one another.

18. A motor vehicle position recognizing system according to claim 17, wherein said vehicle position arithmetic means is so designed as to arithmetically determined said correction factor such that a sum of absolute values of the arithmetically determined values of said vehicle positions determined on the basis of the detected field intensities derived, respectively, from the outputs of two of said plurality of magnetic sensors coincides with the distance between said magnetic sensors.

19. A motor vehicle position recognizing system according to claim 18, further comprising:

fault decision means for making decision as to whether said magnetic sensor suffers a fault, wherein said fault decision means is so designed as to decide that said magnetic sensor suffers a fault when said correction factor departs from a predetermined value range.

* * * * *